Stewart & Bradley,
Fire Annihilator.
No. 3997. Reissued May 24. 1870.
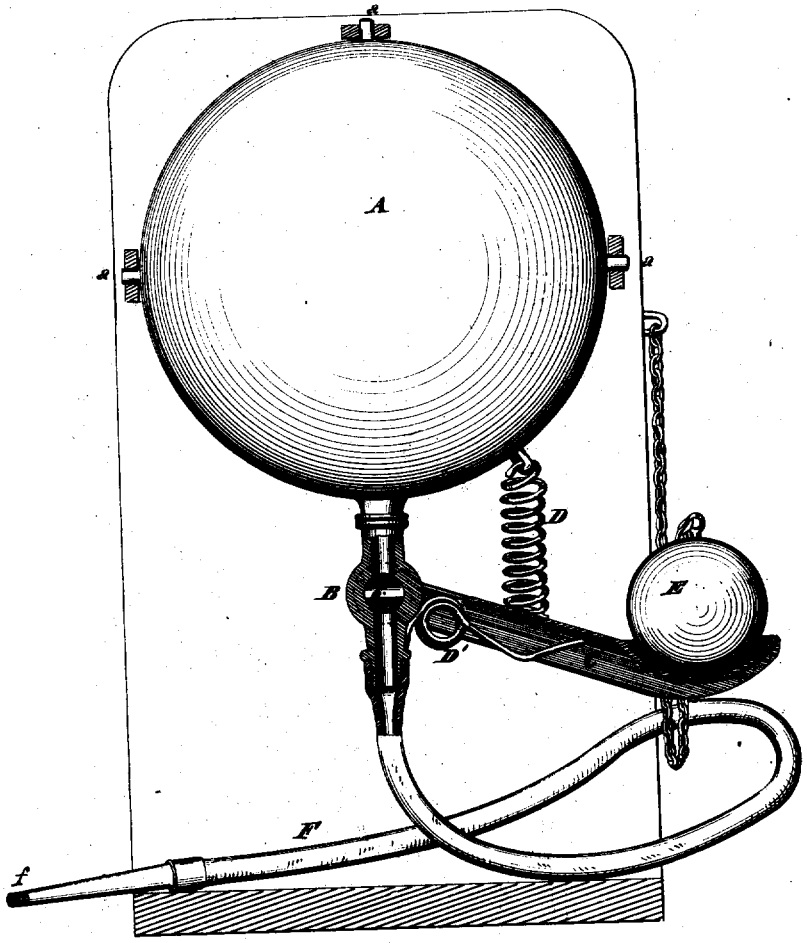
C. A. Scott
V. Van Rammel
Attest
J. H. Stewart
R. G. Bradley
Inventors.
N. PETERS, PHOTO-LITHOGRAPHER, WASHINGTON, D. C.

United States Patent Office.

WILLIAM P. VAN DEURSEN AND WILLIAM C. DAVIS, OF CINCINNATI, OHIO, ASSIGNEES OF H. C. STEWART AND R. T. BRADLEY.

*Letters Patent No.* 101,404, *dated March* 29, 1870; *antedated March* 5, 1870; *reissue No.* 3,997, *dated May* 24, 1870.

IMPROVEMENT IN FIRE-EXTINGUISHERS FOR USE ON RAILROADS, &c.

The Schedule referred to in these Letters Patent and making part of the same.

H. C. STEWART and R. T. BRADLEY, both of Cincinnati, Hamilton county, Ohio, invented a new and useful Automatic Fire-Extinguisher, of which the following is a specification.

*Nature and Objects of the Invention.*

This invention relates to an apparatus or device for the automatic extinguishing of fires in stoves or heating apparatus of railroad-cars, steamboats, ships, and other vehicles, when the same may be overturned, or meet with other accidents which would be likely to cause the fire of the stove to communicate with and ignite the vehicle.

The invention comprises a vessel, of suitable material and dimensions, for holding aerated water, soda-water, or other fire-extinguishing agent, and having a tube provided with a valve or cock, so arranged as to open automatically by any unusual concussion or disturbance of the containing vehicle, and thus permit the extinguishing agent to escape through the tube into the stove or heating apparatus.

*General Description with Reference to the Drawing.*

In construction the invention is substantially as follows:

A is a vessel or holder, of spherical or other shape, and composed of copper or other suitable material, to contain aerated water, or other fire-extinguishing agent, the said vessel having attachments *a a*, by which it is securely fastened to the car or other vehicle as near the stove as is safe and convenient.

Attached to any part of the holder A, and communicating with its lower portion, is a tube, F, whose screw-threaded extremity, *f*, is adapted for ready and permanent insertion in the stove, or into any opening leading to the same.

This tube is provided with a suitable valve or cock, B, here shown in section, and may be wholly metallic, or partly of India rubber or other flexible material, as represented.

The key *b* of the cock has an arm, C, which terminates in a cavity or cup, *c*, to receive a ball, E, whose weight operates to hold the arm to the represented closed position.

This weight may be connected by chain or cord to any permanent portion of the vehicle, to prevent its being lost.

One or more springs, D D′, operate, the instant that the arm C is relieved from the weight E, to elevate said arm, so as to open the cock B, and permit the escape of the contents of the vessel A into the stove.

The cock B is provided with a stop with which the key *b* comes in contact, thus retaining the arm C in the position shown in the drawing, whereby the springs are not affected by the rocking or jolting of the car.

*Operation.*

The holder A having been charged with aerated water, or other extinguishing agent, the ball E is placed in the cup *c*, so as by its weight to overcome the springs D D′, and to depress the arm to the position shown, when the cock is closed.

When the car or other vehicle comes in contact with any resisting object, or is overturned, the ball E is thrown out of the cup *c*, so as to remit the arm C to the elevating action of the springs D D′, thus turning the key *b*, and allowing the gas and other contents of the holder to flow through the tube F into the stove, or through the crevices of the latter should it become broken.

The extinguishing agent may be generated in any usual way in the holder itself, or in a separate vessel, and forced thence into the holder.

We claim as new, and the invention of the said H. C. STEWART and R. T. BRADLEY—

1. The provision of a holder for containing aerated water, or other fire-extinguishing agent under pressure, adapted for attachment to and discharging automatically into a stove or heating apparatus, by any unusual disturbance of the vehicle carrying the same, substantially as described.

2. The application of an automatic apparatus, containing aerated water, or other fire-extinguishing agent under pressure, to a stove or heating apparatus of a car or other vehicle, for the purpose of extinguishing fire in case of any unusual concussion or collision, or of an overturn of the vehicle.

3. Discharging, into the stove or heating apparatus of a car or other vehicle, the contents of a fire-extinguisher, by a valve or cock, having an arm or lever adapted to be automatically liberated by any unusual concussion or disturbance of the vehicle.

4. The gas-holder A, cock B, arm C, spring or springs D D′, ball E, and tube F, or their several equivalents, when constructed and adapted to operate substantially as set forth.

In testimony of which invention we hereunto set our hands.

W. P. VAN DEURSEN.
W. C. DAVIS.

Witnesses:
GEO. H. KNIGHT,
JAMES H. LAYMAN.